(12) United States Patent
Birbara et al.

(10) Patent No.: US 8,046,848 B2
(45) Date of Patent: Nov. 1, 2011

(54) SELF-CLEANSING PORTABLE URINE COLLECTION DEVICE

(75) Inventors: Philip J. Birbara, West Hartford, CT (US); Brett L. Stevenson, Spring Lake, MI (US)

(73) Assignee: Beechwood Technologies LC, Fairfax, VA (US)

( * ) Notice: Subject to any disclaimer, the term of this patent is extended or adjusted under 35 U.S.C. 154(b) by 388 days.

(21) Appl. No.: 12/104,857

(22) Filed: Apr. 17, 2008

(65) Prior Publication Data
US 2009/0260140 A1    Oct. 22, 2009

(51) Int. Cl.
*A47K 11/00*    (2006.01)

(52) U.S. Cl. .................. 4/144.1; 4/222; 4/301; 4/144.3; 604/319

(58) Field of Classification Search ............ 4/144.1, 4/144.3, 144.4, 301, 309, 302, 311; 604/319; 134/166 R, 169 R, 104.1
See application file for complete search history.

(56) References Cited

U.S. PATENT DOCUMENTS

| | | | |
|---|---|---|---|
| 2,968,046 A | 1/1961 | Duke | |
| 3,114,916 A | 12/1963 | Hadley | |
| 4,130,123 A * | 12/1978 | Wines et al. ............... | 134/56 R |
| 4,270,539 A | 6/1981 | Michaud | |
| 4,360,933 A | 11/1982 | Kimura et al. | |
| 4,531,939 A | 7/1985 | Izumi | |
| 4,631,061 A | 12/1986 | Martin | |
| 4,747,166 A | 5/1988 | Kuntz | |
| 4,904,248 A | 2/1990 | Vaillancourt | |
| 5,053,027 A | 10/1991 | Manfredi | |
| 5,328,633 A | 7/1994 | Hasting et al. | |
| 5,551,097 A * | 9/1996 | Short ............................. | 4/301 |
| 5,701,612 A | 12/1997 | Daneshvar | |
| 6,093,387 A | 7/2000 | Birbara et al. | |
| 6,493,883 B2 * | 12/2002 | Jones ........................... | 4/144.1 |
| 6,578,206 B1 | 6/2003 | LaBrash | |
| 6,665,889 B2 * | 12/2003 | Kim ............................. | 4/443 |
| 6,673,055 B2 * | 1/2004 | Bemis et al. ................ | 604/319 |
| 6,706,027 B2 | 3/2004 | Harvie | |
| 6,740,066 B2 | 5/2004 | Wolff et al. | |
| 6,857,137 B2 | 2/2005 | Otto | |
| 6,918,899 B2 | 7/2005 | Harvie | |
| 7,131,964 B2 | 11/2006 | Harvie | |
| 7,135,012 B2 | 11/2006 | Harvie | |
| 7,141,043 B2 | 11/2006 | Harvie | |
| 7,328,070 B2 | 2/2008 | Gerber et al. | |
| 2006/0277670 A1 | 12/2006 | Baker et al. | |

\* cited by examiner

*Primary Examiner* — Gregory Huson
*Assistant Examiner* — Janie Christiansen
(74) *Attorney, Agent, or Firm* — Brinks Hofer Gilson & Lione (57) ABSTRACT

A self-cleansing portable urine collection device and method of collecting urine in a self-cleansing portable urine collection device is provided. The collection device includes a housing which houses a urine collection receptacle configured to collect urine from a user. A cleansing container which retains a cleansing solution is configured to supply the cleansing solution to the receptacle. The device further includes a reservoir coupled to the receptacle and configured to receive the urine and the cleansing solution collected by the receptacle. A pump coupled to the receptacle and the reservoir is configured to transport the urine and the cleansing solution from the receptacle to the reservoir.

18 Claims, 5 Drawing Sheets

SELF-CLEANSING PORTABLE URINE COLLECTION DEVICE

BACKGROUND

1. Field of the Invention

The present invention generally relates to a urine collection device. More particularly, the invention relates to a self-cleansing portable urine collection device.

2. Description of Related Art

Millions of people worldwide are afflicted with problems of urinary incontinence. The economic costs of this distressing condition are extremely high and the cost in terms of human suffering is incalculable. Urine collection devices have been extensively studied in conjunction with bedridden and incontinent individuals. Bedpans, diapers and catherization devices are generally utilized for those confined to beds for reasons of illness and disabilities. All of these practices have their drawbacks in view of suitable comfort and sanitary practices. Bedpan positioning is often difficult and urine collection is often not complete. Diapers are costly, time consuming to attach, and continued usage often leads to skin rashes, chaffing discomfort, and potential infections. Catherization devices are associated with a host of medical problems, particularly urinary tract infections and urethral erosions.

Another class of devices that has been developed more recently includes urine collection devices that employ urine liquid pumps to pump liquid from a collection receptacle to a collection reservoir. The pumps are effective in pumping liquids, but are incapable of providing the required airflows to completely purge urine from the surfaces of the collection receptacle, tubing, and pump internals of the collection device. Consequently, the incomplete removal of urine contributes to the probable buildup of precipitates resulting from the evaporation of urine residuals between device usages and thus creates system maintainability issues and undesirable odor and bacterial control concerns.

Typically, urine contains about 96 percent water and about 4 percent solids in solution. About half of the solids consist of urea $((NH_2)_2CO)$, while the remainder of the solids includes chloride, sodium, potassium, nitrogen, ketosteroids, phosphate, sulfur, ammonia, creatinine, and uric acid. Without some form of pretreatment, many of the constituents of urine will decompose at room temperature, resulting in the discharge of odiferous gases and providing conditions that contribute to the growth of bacteria. In particular, urea decomposes resulting in the formation of ammonia and carbon dioxide, and a significant amount of solids precipitate out of solution resulting in the fouling of urine collection equipment. It is unlikely that a periodic flushing of the collection device with a cleansing solution will be effective in the removal of these odiferous precipitate deposits once they are allowed to form.

Thus, there exists a need for a self-cleansing portable urine collection device that reduces urine odors, disinfects surfaces within the collection device, prevents bacterial growth within the collected urine, and thereby reduces system failures and maintenance expenses relating to these failures.

SUMMARY

Embodiments of the present invention provide a self-cleansing portable urine collection device, and a method of collecting urine in a self-cleansing portable urine collection device. Examples of the present invention reduce undesirable odors and system failures caused by bacterial growth resulting from a buildup of urine precipitates within a urine collection device.

In one embodiment, the present invention provides a self-cleansing portable urine collection device. The collection device includes a urine collection receptacle configured to collect urine from a user. The device further includes a container that retains a cleansing solution. The container is configured to supply the cleansing solution to the receptacle. A reservoir is in fluid communication with the receptacle and configured to receive the urine and the cleansing solution collected by the receptacle. A pump is coupled to the receptacle and the reservoir and is configured to transport the urine and the cleansing solution from the receptacle to the reservoir.

In another embodiment, a method of collecting urine in a self-cleansing portable urine collection device is provided. The method comprises providing a urine collection device having a housing including a housing access door. The housing of the urine collection device further includes a urine collection receptacle configured to collect urine from a user, a cleansing container configured to supply a cleansing solution to the receptacle, a reservoir configured to receive the urine and the cleansing solution collected by the receptacle, a first pump configured to transport the urine from the receptacle to the reservoir, a second pump configured to transport the cleansing solution from the container to the receptacle, and a control device coupled to the first and second pumps configured to provide automatic activation and deactivation of the first and second pumps. The method further comprises the steps of opening the housing access door, positioning the receptacle in close proximity to the user's body, collecting urine from the user within the receptacle, and transporting the urine from the receptacle to the reservoir via a first conduit. The method further comprises the steps of returning the receptacle to the housing, closing the housing access door, supplying the cleansing solution from the container to the receptacle via a second conduit, and transporting the cleansing solution from the receptacle to the reservoir via the first conduit thereby flushing any residual urine within the collection device to the reservoir.

Further objects, features and advantages of this invention will become readily apparent to persons skilled in the art after a review of the following description, with reference to the drawings and claims that are appended to and form a part of this specification.

DETAILED DESCRIPTION

Figure 1A:
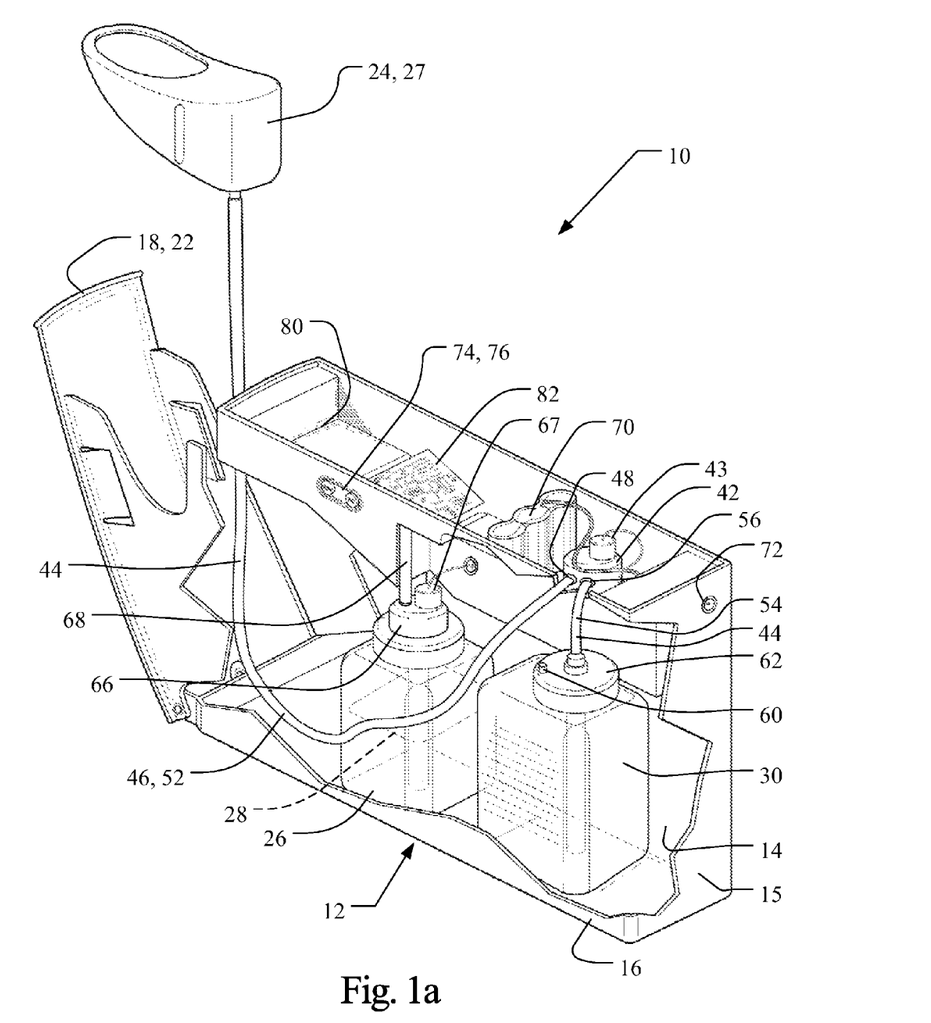
FIG. 1a is a perspective view of a urine collection device, in accordance with an embodiment of the present invention, showing the receptacle removed from the housing for use.
Figure 1B:
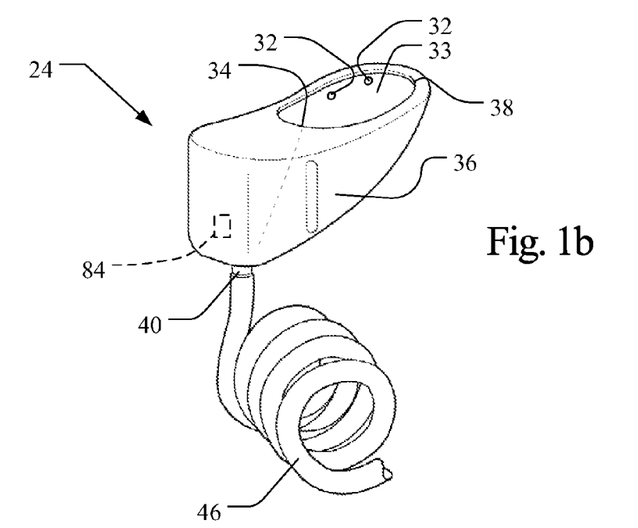
FIG. 1b is an enlarged perspective view of a receptacle in accordance with an embodiment of the present invention.
Figure 2:
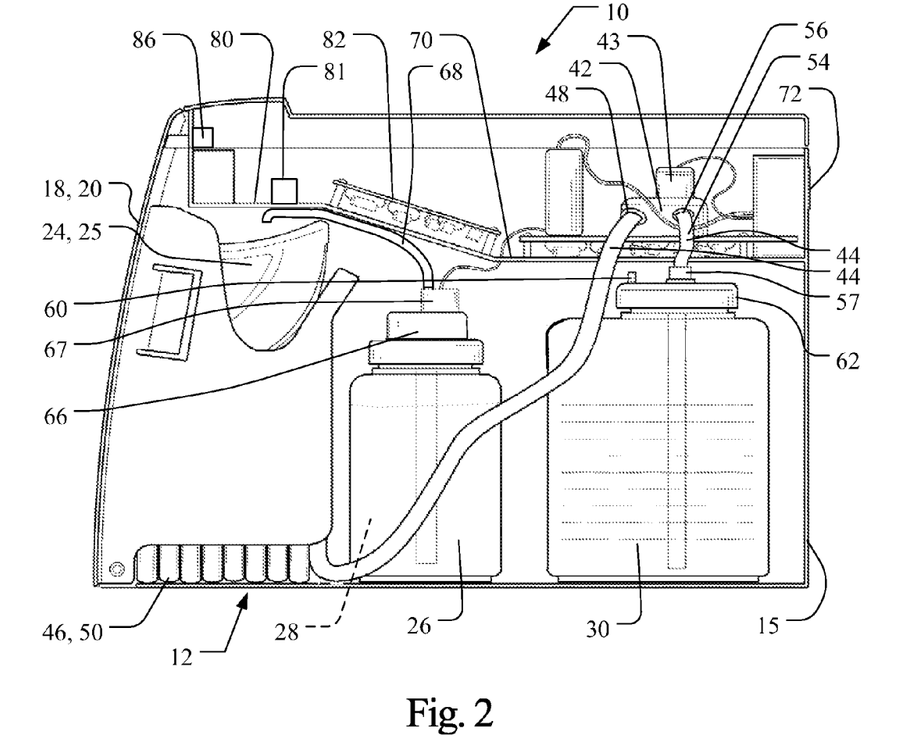
FIG. 2 is a side view of a urine collection device, in accordance with another embodiment of the present invention, showing the receptacle in its stored position.
Figure 3:
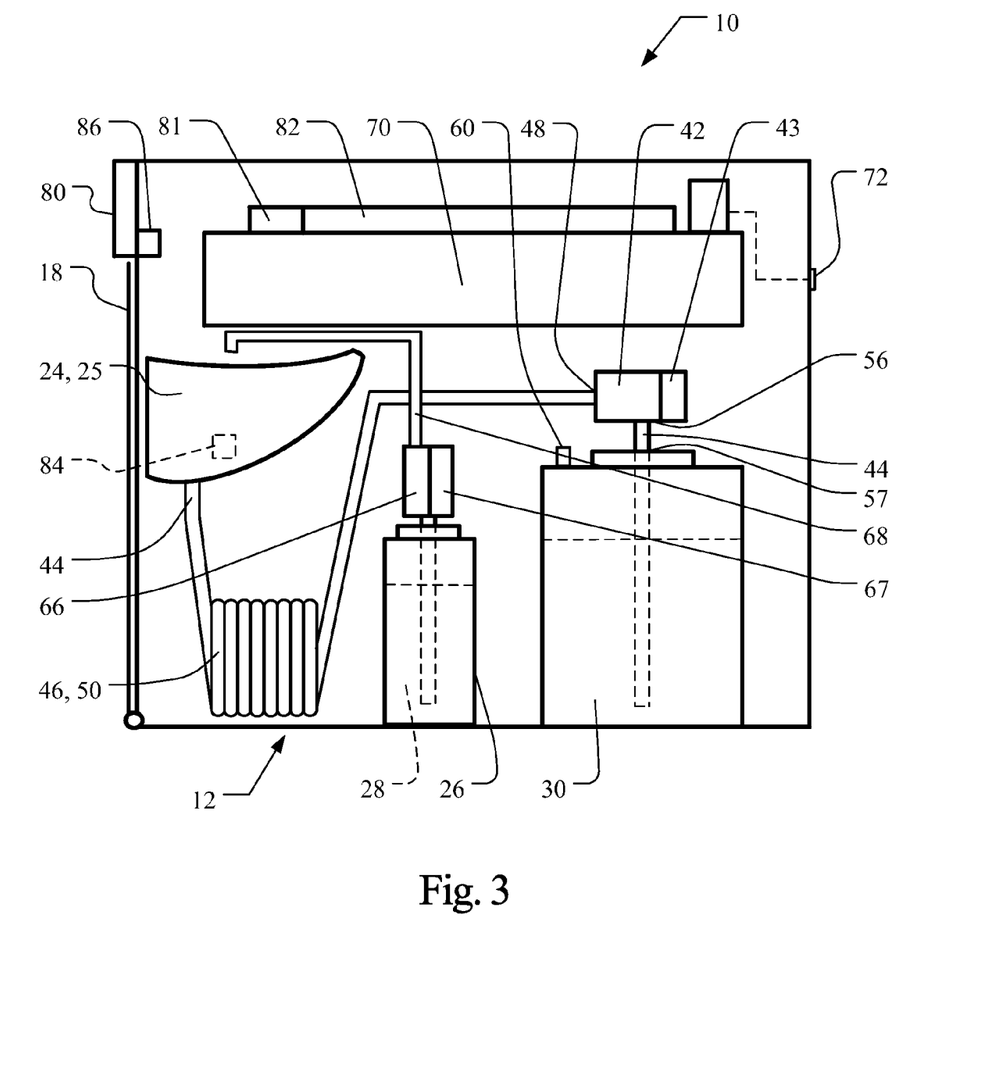
FIG. 3 is a schematic diagram of the urine collection device, in accordance with another embodiment of the present invention, showing the receptacle in its stored position.

Referring now to the drawings, illustrated in FIGS. 1-3 is a self-cleansing portable urine collection device 10 in accordance with the principles of the present invention. In general, the device 10 includes a housing 12 having housing walls 14, 15, 16, at least one of which may be a removable panel to provide access to the interior of the collection device 10, and a housing access door 18 selectively moveable between a closed position 20 (FIG. 2) and an open position 22 (FIG. 1). Disposed within the housing 12 are a urine collection receptacle 24, a cleansing container 26 containing a cleansing solution 28, and a collection reservoir 30. The receptacle 24 is configured to collect urine from a user and is selectively moveable between a stored position 25, in which the receptacle 24 is contained within the housing 12, and a collection position 27, in which the receptacle 24 is positioned in close proximity to the user's body (not shown) for receiving urine.

The receptacle 24 is designed to be non-invasive to the user. In the case of a female user, the receptacle 24 is configured to seal about the periphery of the vaginal opening. For male users, it is not required that the receptacle 24 seal against the body. Rather, the receptacle 24 may be configured to receive a directed urine effluent flow. It is desirable that the top of the receptacle 24 contain a small orifice 32 preferably less than about 1.0 mm at the upper inner surface 33 in close proximity to the body to provide a limited air flow to assist in removing residual urine upon cessation of the urine flow. The bottom inner surface 34 defines a cavity 36 configured to collect and hold the urine. Fluid enters the receptacle 24 through an inlet opening 38 and exits the receptacle 24 through an outlet 40 located at the lowest elevation of the receptacle's bottom inner surface 34.

A suction pump 42 includes a drive device 43, such as a motor or any suitable pump driving device, and is configured to transport fluid from the receptacle 24 to the reservoir 30 via a first fluid channel or conduit 44. The suction pump 42 may be, for example, a diaphragm pump, a piston pump, or any other suitable positive displacement pump. A diaphragm pump with an unrestricted liquid flow rate of greater than about 600 cc/min is preferred. The first conduit 44 includes an extendable coiled receptacle drainage tube 46 connecting the outlet 40 of the receptacle 24 to the inlet 48 of the suction pump 42. The receptacle drainage tube 46 is pliable and flexible and preferably made of a thermoplastic material that is biased into its coiled form 50 by the elastic memory of the thermoplastic material. The receptacle drainage tube 46 remains in its coiled form 50 when the receptacle 24 is contained within the housing 12 in the stored position 25. Uncoiling the receptacle drainage tube 46 into its extended form 52 allows the user to conveniently position the receptacle 24 in the collection position 27. Preferably, the receptacle drainage tube 46 measures about 40 inches in length in its extended form 52 to assist the user with positioning of the receptacle 24 before urinating.

Upon returning the receptacle 24 to the stored position 25, the self-retracting feature of the receptacle drainage tube 46 allows for minimizing the storage volume of the receptacle 24 and the attached receptacle drainage tube 46. The internal diameter of the receptacle drainage tube 46 is preferably less than about six (6) mm to minimize the quantity of residual urine that the suction pump 42 is generally incapable of removing without the flushing of a cleansing solution. A check valve may be inserted at the outlet 40 of the receptacle 24 to prevent fluid from within the drainage tube 46 from flowing back into the receptacle 24. Additionally, a screen filter may be situated over the outlet 40 to prevent particulates greater than about forty (40) microns from exiting the receptacle 24 and entering the receptacle drainage tube 46, thus interfering with the performance of the suction pump 42.

The first conduit 44 further connects the suction pump 42 to the reservoir 30 via a pump drainage tube 54. The pump drainage tube 54 connects the outlet 56 of the suction pump 42 to the reservoir 30. Quick disconnect fittings attached to the drainage tube 54 facilitate the removal of the reservoir 30 for waste disposal. The reservoir 30 is preferably constructed of a collapsible vinyl collection bag or a rigid bottle made of polyethylene, polypropylene, or any suitable material. Also preferably, the reservoir 30 may include a hydrophobic membrane or a vent 60 positioned along the upper wall surface of the reservoir 30 or in the cap 62 of a reservoir bottle 30. Preferably, the vent 60 has a pore size of about 0.4 microns, which is small enough to prevent the passage of bacteria. The vent 60 serves to remove any air sucked into the reservoir 30 with the urine and prevents bacteria from escaping into the surrounding atmosphere. The surface area of the vent 60 is sufficient to allow air to flow through, but not liquid. Therefore, if the reservoir 30 is inadvertently tipped, the vent 60 prevents spillage of the urine within the housing 12 of the collection device 10.

The cleansing container 26 is also disposed within the housing 12 and may be located adjacent to the receptacle 24 when the latter is in its stored position 25. As noted above, the cleansing container 26 contains a cleansing solution 28 for flushing or purging urine residuals from the collection device 10 that tend to adhere to the internal surfaces of the collection device 10 after urine has been collected. Similar to the reservoir 30, the cleansing container 26 may include a cap with a vent which allows air to enter the cleansing container 26 to compensate for the withdrawal of cleansing solution 28 so as to avoid a vacuum condition within the cleansing container 26.

A cleansing solution pump 66, in fluid communication with the cleansing container 26 and the receptacle 24, supplies the cleansing solution 28 to the receptacle 24 via a second fluid channel or conduit 68 when the receptacle 24 is in its stored position 25. The cleansing solution pump 66 includes a drive device 67, such as a motor or any other suitable pump driving device, and is configured to transport the cleansing solution 28 from the cleansing container 26 to the receptacle 24. The cleansing solution 28 is then conveyed to the reservoir 30 by activation of the suction pump 42. The cleansing solution pump 66 is preferably a miniature oscillating piston pump but may alternatively be a diaphragm pump or any other suitable pump.

The cleansing container 26 is preferably a bottle formed of polyethylene, polypropylene, or any other suitable material, and has a capacity of around 600 cc. A volume of 600 cc should allow for about 24 to 30 flushes of the cleansing solution 28 at about 20-25 cc per flush. The average urination is approximately 300 cc. Therefore, assuming a cleansing solution flush volume of around 20 cc for each urination, a reservoir 30 with a volume of about 1,250 cc should be adequate to contain an individual user's output for about 12 to 15 hours.

The cleansing solution 28 preferably contains bactericidal/deodorizing chemicals, which may be conveniently made up by dissolving tableted, crystal, powder, or liquid forms of the chemicals in water. For example, tablets or powder of potassium persulfate (i.e., Oxone™, Dupont) or acetic acid, dissolved in water, would serve to deodorize and inhibit bacterial growth. A variety of benign acidic agents may be employed as an active agent. As used herein, the term benign acidic agent is employed to designate a mixture of one or more conventional acids that are safe to handle, safe to the user, innocuous to the elements of the system in which they are used, and not harmful and nontoxic to the environment. By way of example, the following may be used: carbon based acids, such as citric acid, tartaric acid, polyacrylic acid, water soluble copolymers of acrylic acid, poly(maleic anhydride), water soluble copolymers of maleic anhydride, and various mixtures thereof. Other possible bactericidal agents include, but are not limited to, sodium perborate and sodium bisulfate. Tableted forms of the chemical formulations can also be added to the reservoir 30 prior to the introduction of urine into the reservoir 30. For example, a tablet containing approximately 2-3 grams of Oxone™ should be sufficient to disinfect, deodorize, and acidify 1 liter of urine. The chemically treated urine can then be transferred to a waste disposal location at the user's convenience.

A power source 70 is provided within the housing to drive the pumps 42, 66. As such, a suitable battery pack or energy storage device may be used to power the drive devices 43, 67. Preferably, a rechargeable battery pack, ranging from about 12-24 volts, is employed to energize the drive devices 43, 67 and should last several days before needing recharging. For the latter purpose one of the housing walls 14, 15, 16 includes a battery recharging connector 72 configured to connect to an external power source to recharge the battery pack.

Activation of the suction pump 42 and the cleansing solution pump 66 may be triggered by a manual trigger, such as an ON/OFF switch, or an automatic trigger, such as an electronic sensor element. In the embodiment, illustrated in FIG. 1, the collection device 10 includes manual on/off switches 74, 76 configured to activate/deactivate the drive devices 43, 67 of the pumps 42, 66, respectively. For example, when the user feels the urge to urinate, the user opens the housing access door 18 and positions the receptacle 24 in the collection position 27. The user activates the drive device 43 of the suction pump 42 by flipping the switch 74 to ON and the user begins urinating. The suction pump 42 draws the urine through the collection device 10, emptying the receptacle 24 and drying the skin of the user. The urine is drawn out of the receptacle 24 at the receptacle outlet 40 and enters the first conduit 44 at the inlet of the receptacle drainage tube 46. The urine passes through receptacle drainage tube 46, through the pump 42, through the pump drainage tube 54, through the reservoir inlet 57, and into the reservoir 30. After the user urinates, the user then returns the receptacle 24 to the stored position 25 and deactivates the drive device 43 of the suction pump 42 by flipping the switch 74 to OFF.

The user then activates the drive device 67 of the cleansing solution pump 66 by flipping the switch 76 to ON. In order to purge the cleansing solution 28 through the collection device 10, the user reactivates the drive device 43 of the suction pump 42 by flipping the switch 74 to ON and leaving the switch 76 in the ON position for a predetermined time period, which corresponds with the predetermined volume of cleansing solution 28 to be supplied to the receptacle 24 for each flush, as well as the flush rate of the cleansing solution pump 66. For example, a pump 66 delivering cleansing solution at a rate of around 300 cc/min requires around 4 seconds to deliver 20 cc of the cleansing solution. After the predetermined time period has passed, the user deactivates the drive device 67 of the cleansing solution pump 66 by flipping the switch 76 to OFF. The user allows the suction pump 42 to run a short period of time after deactivating the drive device 67 of the cleansing solution pump 66 to ensure that the suction pump 42 sufficiently purges most of the fluid, including nearly all of the urine residuals, from within the collection device 10 into the reservoir 30. The user then deactivates the drive device 43 of the suction pump 42 by flipping the switch 74 to OFF until the next time the user needs to urinate. While the above describes this process via manual operation of the cleansing solution pump 66 and the suction pump 42, the coordinated action of these two pumps 66, 42 could be effectuated via on-board and automatic controls.

As thus far described, operation of the collection device 10 has been manually done. However, in another embodiment, illustrated in FIG. 2, the collection device 10 includes a controller, such as a control panel 80 including a printed circuit control board 82, in conjunction with electronic sensors. For example, the collection device 10 of FIG. 2 includes an electronic sensor 84 capable of detecting the presence of fluid within the receptacle 24. The electronic sensor 84 may include a heat transducer, or an optical, resistivity or conductivity device. Preferably, the electronic sensor 84 is located near the inlet opening 38 of the receptacle 24, such that it detects fluid entering the receptacle; or it may be located near the bottom inner surface 34, such that it detects even a small quantity of fluid left within the cavity 36 of the receptacle. Thus, when the user feels the urge to urinate, the user opens the housing access door 18, positions the receptacle 24 in the collection position 27 and begins to urinate. The sensor 84 detects the presence of urine within the receptacle 24 and transmits a start signal to the printed circuit control board 82 to activate the drive device 43 of the suction pump 42. The suction pump 42 serves to remove urine from the receptacle 24 and dry out the receptacle 24.

Following urination, the user returns the receptacle 24 to the stored position 25. After the bulk of the urine is removed from the receptacle 24, the sensor 84 triggers the deactivation of the drive device 43 of the suction pump 42, i.e., the sensor 84 transmits a stop signal to the printed circuit control board 82 to deactivate the drive device 43 of the suction pump 42 when the sensor 84 no longer detects the presence of fluid within the receptacle 24. The drive device 67 of the cleansing solution pump 66 is then activated for a predetermined time period to pump a predetermined quantity of cleansing solution 28 from the cleansing container 26 into the receptacle 24. The sensor 84 detects the cleansing solution 28 within the receptacle 24 and transmits a start signal to the printed circuit board 82 to activate the drive device 43 of the suction pump 42. While the cleansing solution pump 66 supplies the cleansing solution 28 to the receptacle 24, the suction pump 42 serves to remove the cleansing solution from the receptacle 24, to dry out the receptacle 24, and purge the cleansing solution 28 through the collection device 10 to rid the collection device internal surfaces of any urine residuals and thus prevent precipitates and resulting bacteria from forming.

After the cleansing solution 28 is removed from the receptacle 24 and purged through the collection device 10, the sensor 84 detecting no fluid within the receptacle and triggers the deactivation of the drive device 43 of the suction pump 42. The deactivation of the drive device 43 may, in part, be triggered by a timer 81 within the control panel 80. For example, the suction pump 42 may continue to run for a predetermined period of time after the sensor element 84 no longer detects the presence of fluid within the receptacle 24 to ensure that the suction pump 42 sufficiently purges most of the fluid, including nearly all of the urine residuals, from within the collection device 10 and receptacle drainage tube 46 into the reservoir 30.

The collection device 10 may further include an electronic sensor 86 capable of detecting the opening and closing of the housing access door 18. When the user opens the housing access door 18, the sensor 86 detects the opening of the housing access door 18 and transmits a start signal to the printed circuit control board 82 to activate the drive device 43 of the suction pump 42. The suction pump 42 is therefore activated before any urine is even detected within the receptacle 24 and creates a vacuum which draws ambient air through the collection device 10. The orifice 32 provides a passageway through which ambient air is drawn into the collection device 10. This is particularly advantageous in the case of female users, where the inlet opening 38 of the receptacle 24 is positioned against the user's body to limit the suction vacuum. As the user urinates, the vacuum created by the suction pump 42 draws the urine through the collection device 10.

The continued activation of the drive device 43 of the suction pump 42 is triggered, in part, by the housing access door 18 remaining in the open position 22, and also, in part, by the sensor element 84 simultaneously detecting the presence of urine within the receptacle 24. Following urination, the user returns the receptacle 24 to the stored position 25 and closes the housing access door 18. Deactivation of the drive device 43 of the suction pump 42 may be triggered, in part, by the closing of the housing access door 18 to the closed position 20, wherein the sensor 86 transmits a stop signal to the printed circuit control board 82 to deactivate the drive device 43. This may happen immediately after detecting the closing of the housing access door 18. Alternatively, the control panel 80 may include a timer 81 such that after the closing of the housing access door 18, the printed circuit control board 82 does not deactivate the drive device 43 of the suction pump 42 until a predetermined period of time has passed. The deactivation of the drive device 43 may also be triggered, in part, by the absence of fluid within the receptacle, wherein the sensor 84 transmits a stop signal to the printed circuit control board 82 to deactivate the drive device 43 either with or without a timer to allow sufficient time to remove urine from within the receptacle drainage tube 46.

The drive device 67 of the cleansing solution pump 66 is then activated for a predetermined time period to pump a predetermined quantity of cleansing solution 28 from the cleansing container 26 into the receptacle 24. Preferably, the cleansing solution pump 66 is also activated automatically after collection of urine and closing of the housing access door 18. Since the cleansing solution pump 66 is necessary to supply the cleansing solution 28 to the receptacle 24, and eventually the entire collection device 10, in order to flush and eliminate residual urine within the internal surfaces of the collection device, it makes sense that the cleansing solution pump 66 is only activated after urine has actually entered and passed through the collection device 10. Therefore, activation of the drive device 67 is preferably triggered only after a recent collection and transportation of urine through the collection device 10.

For example, since the positioning of the receptacle 24 into the stored position 25, followed by the closing of the housing access door 18, are indications of recent urination (i.e., an opening of the housing access door and removal and return of the receptacle 24 to the stored position 25), activation of the drive device 67 of the cleansing solution pump 66 may be triggered, in part, by the detection of the receptacle 24 being positioned in the stored position 25, and, in part, by the detection of the housing access door 18 closing to the closed position 20. The receptacle 24 must be in the stored position 25, adjacent the cleansing container 26, in order for the cleansing solution pump 66 to supply the cleansing solution 28 from the cleansing container 26 to the receptacle 24, and the housing access door 18 must be closed to ensure that during flushing of the cleansing solution 28, the cleansing solution 28 remains within the housing 12 of the collection device 10 and does not contact the user, therefore providing an efficient, user-safe automatic self-cleansing portable urine collection device 10.

Preferably, the sensor 84 is capable of detecting not only the presence of a fluid within the receptacle 24, but also the positioning of the receptacle 24 between the stored position 25 and the collection position 27. Alternatively, another sensor may be provided to detect the positioning of the receptacle 24 close to a person's body. Upon the detection of the receptacle 24 being returned to the stored position 25, the sensor 84 transmits a start signal to the printed circuit control board 82 to activate the drive device 67 of the cleansing solution pump 66. The activation of the cleansing solution pump 66 is triggered, in part, by the communication between the sensor 84 and the printed circuit control board 82 and upon the detection of the housing access door 18 closing to the closed position 20. The sensor 86 thereafter transmits a start signal to the printed circuit control board 82 to activate the drive device 67 of the cleansing solution pump 66. Thus, the activation of the cleansing solution pump 66 is triggered, in part, by the communication between the sensor 86 and the printed circuit control board 82.

In addition, the activation of the drive device 67 may also be triggered, in part, by the passing of a predetermined time period. For example, the printed circuit control board 82 may not activate the drive device 67 until a predetermined period of time has passed after detection of the receptacle 24 in the stored position 25 and closing of the housing access door 18 to the closed position 20. This time condition is communicated to the printed circuit control board 82 by the timer 81. Thus, since the collection of urine within the receptacle 24 triggers activation of the drive device 43 of the suction pump 42, this predetermined time period between the detection of the receptacle 24 being positioned to the stored position 25 and/or the housing access door 18 closing to the closed position 20 and the activation of the drive device 67 of the cleansing solution pump 66, allows the suction pump 43 to run and remove at least most of the urine within the receptacle 24 before flushing the cleansing solution 28 into the receptacle 24.

As the cleansing solution 28 is supplied to the receptacle 24, the sensor 84 detects the presence of fluid (i.e., the cleansing solution 28) within the receptacle 24 and transmits a start signal to the printed circuit control board 82 to activate the drive device 43 of the suction pump 42. The suction pump 42 serves to draw the cleansing solution 28 through the collection device 10, from the receptacle 24 to the reservoir 30, to purge the internal surfaces of the collection device 10 of any residuals and thus prevent precipitates and resulting bacteria from forming.

The printed circuit control board 82 is programmed to activate the drive device 67 of the cleansing solution pump 66 for a predetermined time period, which corresponds with the predetermined volume of cleansing solution 28 to be supplied to the receptacle 24 for each flush and the flush rate of the cleansing solution pump 66. Further, deactivation of the drive device 67 of the cleansing solution pump 66 may be triggered before the predetermined period of time has passed, for example, by the opening of the housing access door 18 and/or the removing of the receptacle 24 from the stored position 25.

After the cleansing solution 28 has been withdrawn from the receptacle 24 and purged through the collection device 10, the sensor 84 triggers the deactivation of the drive device 43 of the suction pump 42 based upon the detection of an absence of fluid within the receptacle 24. The deactivation of the drive device 43 may be triggered, alternatively or partly, by the passing of a predetermined time period. For example, the printed circuit control board 82 may not deactivate the drive device 43 of the suction pump 42 until a predetermined period of time has passed after the sensor 84 has detects an absence of fluid within the receptacle 24. Via this time condition, it is ensured that the suction pump 42 sufficiently purges most of the fluid, including nearly all of the urine residuals, from within the collection device 10 into the reservoir 30.

The device 10 may include an alarm which warns the user when the reservoir 30 reaches a predetermined reservoir capacity and thus warns the user to empty the reservoir 30. For example, the printed circuit control board 82 may be coupled with a sensor capable of detecting the volume of fluid within the reservoir 30. Upon the detection of the volume of fluid within the reservoir approaching the predetermined reservoir capacity, the sensor transmits a signal to the printed circuit control board 82 to sound the alarm. The reservoir 30 may include a reservoir drainage tube for draining the fluid from the reservoir 30. During emptying of the reservoir 30, for example, the user adjusts one of the housing walls 14, 15, 16 to access the reservoir 30. The user easily removes the reservoir 30 from the device 10 via quick disconnect fittings attached to the pump drainage tube 54. The drainage tube may include a valve or a clamp adjustable between an open and a closed position. After removal of the reservoir 30 from the device 10, the user may adjust the valve of the drainage tube to the open position to drain the fluid within the reservoir 30. In the case of a reservoir bottle 30, the user may easily remove the cap of the bottle to pour out and dispose of the fluid within the reservoir 30. After the reservoir 30 is emptied, the user may dispose of the reservoir 30 and insert a new reservoir 30 into the housing 12. Alternatively, the reservoir 30 may be sanitized and reattached within the housing 12.

Figure 4A:
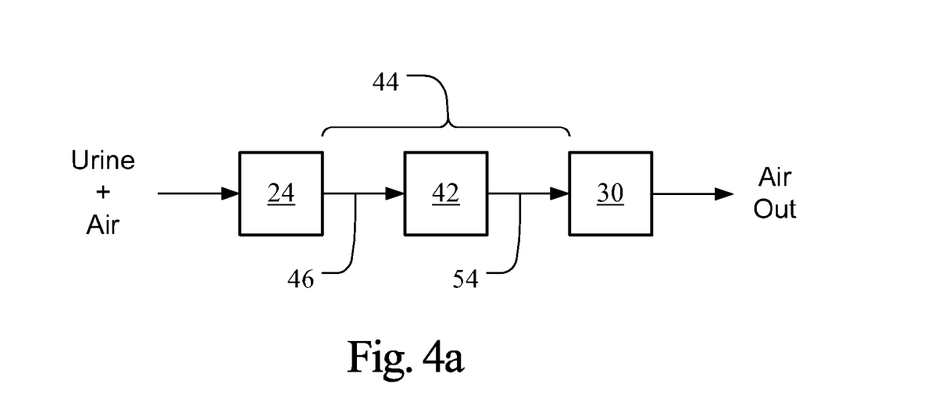
FIGS. 4a and 4b are functional block diagrams of a urine collection device, in accordance with the principles of the present invention, showing functionally the use and operation of the device.
Figure 4B:
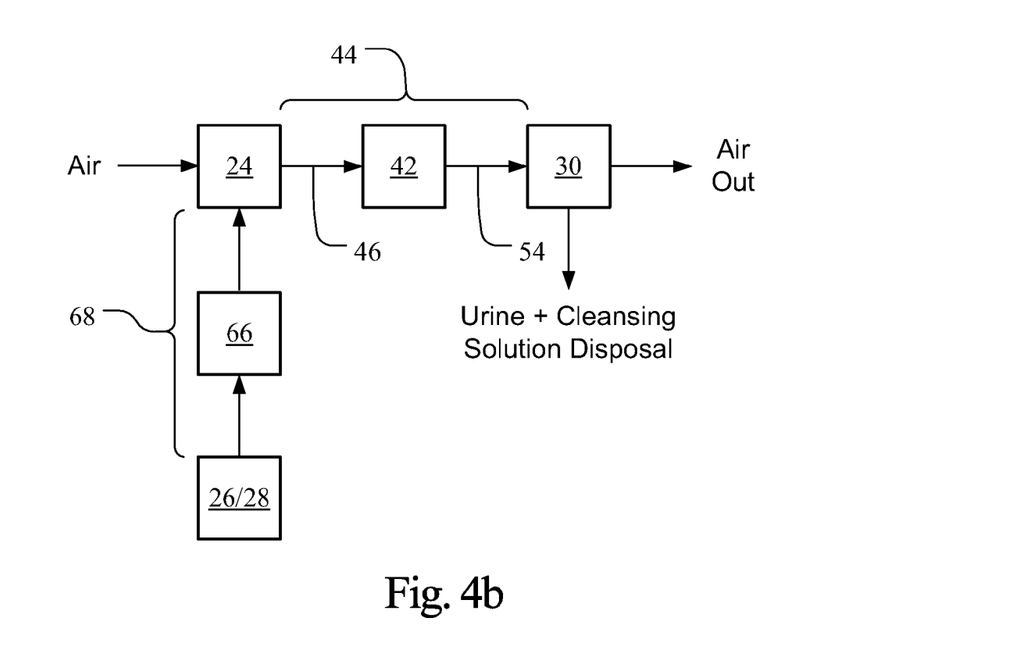

FIGS. 4*a* and 4*b* illustrate the flow of urine and the cleansing solution 28 through the collection device 10. Urine and air enter the collection device at the receptacle 24 (FIG. 4*a*). The suction pump 42 transports the urine from the receptacle 24 through the first conduit 44 (i.e., through the receptacle drainage tube 46, the suction pump 42, and the pump drainage tube 54) and into the reservoir 30. The cleansing solution pump 66 then transports the cleansing solution 28 from the cleansing container 26 to the receptacle 24 via the second conduit 68 (FIG. 4*b*). And the suction pump 42 transports the cleansing solution 28 from the receptacle 24 through the first conduit 44 (i.e., through the receptacle drainage tube 46, the suction pump 42, and the pump drainage tube 54) and into the reservoir 30. Air pumped into the reservoir 30 escapes from the reservoir 30 through the vent 60; the urine and cleansing solution mixture remaining within the reservoir 30 to be disposed of by emptying the reservoir 30.

Figure 5:
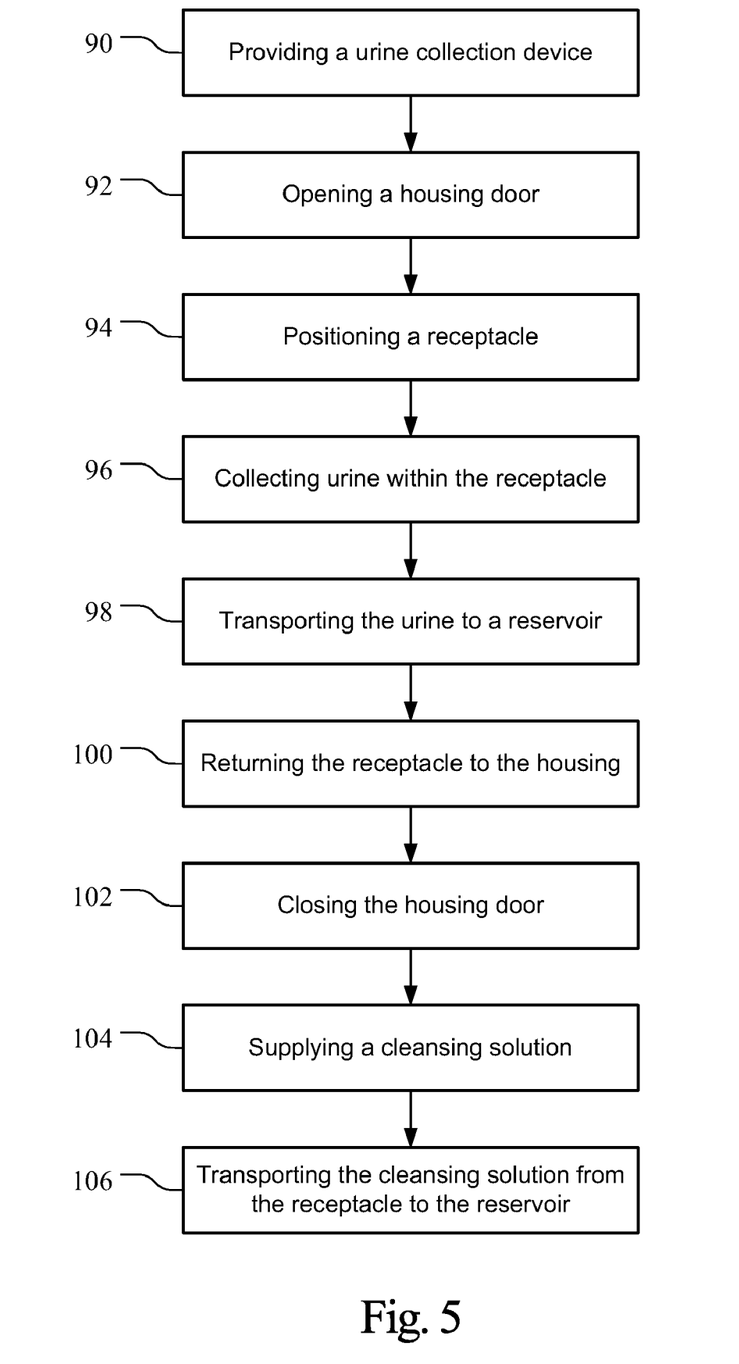
FIG. 5 is a flowchart depicting a method of collecting and treating urine in accordance with one aspect of the present invention.

FIG. 5 illustrates the method of operation of the self-cleansing portable urine collection device 10. The method comprises the step 90 of providing a urine collection device 10 having a housing 12; a housing access door 18; a urine collection receptacle 24 configured to collect urine from a user; a cleansing container 26 configured to supply a cleansing solution 28 to the receptacle 24; a reservoir 30 configured to receive urine and cleansing solution 28 collected by the receptacle 24; a suction pump 42 having a drive device 43 and configured to transport the urine from the receptacle 24 to the reservoir 30; a cleansing solution pump 66 having a drive device 67 and configured to transport the cleansing solution 28 from the cleansing container 26 to the receptacle 24; and a control device associated with the pumps 42, 66 configured to provide automatic activation and deactivation of the drive devices 43, 67.

The method further comprises the step 92 of opening the housing access door 18, positioning the receptacle 24 in close proximity to the user's body (step 94), and collecting urine from the user within the receptacle 24 (step 96). The method further comprises transporting the urine from the receptacle 24 to the reservoir 30 via a first conduit 44 (step 98); returning the receptacle 24 to the housing 12 (step 100) and closing the housing access door 18 (step 102). The method further comprises supplying the cleansing solution 28 from the cleansing container 26 to the receptacle 24 via a second conduit 68 (step 104) and transporting the cleansing solution 28 from the receptacle 24 to the reservoir 30 via the first conduit 44, thereby flushing any residual urine within the collection device 10 to the reservoir 30 (step 106).

Transporting the urine from the receptacle 24 to the reservoir 30 (step 98) includes activating the drive device 43 of the suction pump 42 for a predetermined time period, wherein the opening of the housing access door 18 (step 92) and/or the collecting the urine within the receptacle 24 (step 96) triggers the control device (i.e., the printed circuit control board 82) to activate the drive device 43. Supplying the cleansing solution 28 from the cleansing container 26 to the receptacle 24 includes activating the drive device 67 of the cleansing solution pump 66 for a predetermined time period, wherein the returning the receptacle 24 to the housing 12 (step 100) and/or the closing of the housing access door 18 (step 102) triggers the control device (i.e., the printed circuit control board 82) to activate the drive device 67.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

The invention claimed is:

1. A self-cleansing portable urine collection device comprising:
   a urine collection receptacle configured to collect urine from a user;
   a housing, the receptacle being moveable between a first position in which the receptacle is stored within the housing and a second position in which the receptacle is positioned outside of the housing;
   a cleansing container located within the housing and configured to retain a cleansing solution therein, the container being coupled to a cleansing conduit having a nozzle, the cleansing conduit and nozzle located within the housing, the nozzle remaining within the housing when the receptacle is in the second position and oriented to direct the cleansing solution onto surfaces of the receptacle only when the receptacle is located within the housing;
   a reservoir located within the housing and coupled to the receptacle, the reservoir adapted to receive the urine and the cleansing solution collected by the receptacle; and
   a first pump located within the housing and coupled to the receptacle and the reservoir, the first pump being configured to withdraw the urine and the cleansing solution from the receptacle and provide the urine and the cleansing solution to the reservoir.

2. The device of claim 1, further comprising a first conduit coupled between the receptacle and the reservoir to transport the urine and the cleansing solution from the receptacle to the reservoir, wherein the first conduit includes a receptacle drainage tube fluidly connecting the receptacle and the first pump and a pump drainage tube fluidly connecting the first pump and the reservoir, wherein the receptacle drainage tube is biased to a coiled position when the receptacle is in the first position and extendable to an extended position when the receptacle is in the second position.

3. The device of claim 1, further comprising a second pump located within the housing and coupled to the cleansing container, the second pump being configured to provide the cleansing solution from the cleansing container to the receptacle via the cleansing conduit.

4. The device of claim 3, further comprising a switch associated with at least one of the first and second pumps, the switch being operable by a user to selectively activate and deactivate at least one of the first and second pumps.

5. The device of claim 3, further comprising a control device coupled to at least one sensor and to at least one of the first and second pumps, wherein the at least one sensor and the control device cooperate to activate and deactivate at least one of the first and second pumps.

6. The device of claim 5, further comprising a housing access door selectively moveable between an open position and a closed position, at least one sensor configured to detect the housing access door being in either the open position or the closed position.

7. The device of claim 1, further comprising at least one sensor configured to detect a presence of fluid within the receptacle.

8. The device of claim 1, further comprising a housing access door and at least one sensor configured to detect the housing access door in at least one of an open position and a closed position.

9. The device of claim 5, wherein the control device includes a timer,
wherein the control device is configured to deactivate the first pump based at least in part upon a time condition utilizing the timer, wherein the control device is configured to deactivate the first pump a predetermined time after activation of the first pump.

10. The device of claim 5, wherein the second pump is activated at least in part by the receptacle being positioned in the first position, wherein the at least one sensor transmits a start signal to the control device to activate the second pump upon the detection of the receptacle being positioned in the first position.

11. The device of claim 6, wherein the second pump is activated at least in part by the closing of the housing access door to the closed position, wherein the at least one sensor transmits a start signal to the control device to activate the second pump upon the detection of the closing of the housing access door to the closed position.

12. The device of claim 6, wherein the second pump is activated at least in part by the combination of the closing of the housing access door to the closed position and the receptacle being positioned in the first position, wherein the at least one sensor transmits a start signal to the control device to activate the second pump upon the detection of the closing of the housing access door to the closed position and upon the detection of the receptacle being positioned in the first position.

13. The device of claim 12, wherein the control device includes a timer, wherein the control device is configured to activate the second pump based at least in part upon a time condition utilizing the timer, wherein the control device is configured to activate the second pump a predetermined time after the detection of the closing of the housing access door to the closed position and the receptacle being positioned in the first position.

14. The device of claim 3, wherein each of the first and second pumps includes a drive device, the device further comprising a power source for driving the drive devices.

15. The device of claim 14, wherein the power source includes a rechargeable battery pack, wherein the housing further comprises a housing wall including a battery recharging connector formed therethrough, the battery recharging connector being configured to connect to an external power source to recharge the battery pack.

16. The device of claim 3, wherein at least one of the first and second conduits includes a hydrophobic inner surface to facilitate drainage of the urine and the cleansing solution through the device, wherein the reservoir includes a vent configured to allow air to flow out of the reservoir and to prevent leakage of the urine and the cleansing solution received in the reservoir.

17. The device of claim 1, wherein the cleansing solution includes at least one of water, acetic acid, a carbon based acid, a citric acid, a tartaric acid, a polyacrylic acid, a water soluble copolymer of acrylic acid, a poly(maleic anhydride), a water soluble copolymer of maleic anhydride, sodium bisulfate, sodium perborate, potassium persulfate, and mixtures thereof.

18. The device of claim 1, further comprising a control device coupled to a sensor and an alarm, the sensor being capable of detecting a volume of fluid within the reservoir, wherein the sensor and the control device cooperate to sound the alarm upon the detection of the volume of fluid within the reservoir approaching a predetermined reservoir capacity to provide a warning to the user to empty the reservoir.

* * * * *